United States Patent Office 3,460,989
Patented Aug. 12, 1969

1

3,460,989
METHOD OF TREATING FERROUS METAL
SURFACES
John H. Rusch, P.O. Box 10193, Metairie, La. 70004
No Drawing. Filed Sept. 2, 1964, Ser. No. 394,072
Int. Cl. B08b 3/08, 17/00
U.S. Cl. 134—3                                21 Claims

ABSTRACT OF THE DISCLOSURE

Treatment of ferrous metal surfaces containing scale in order to remove the latter. The procedure involves immersing the surface in an aqueous phosphoric acid solution containing a corrosion inhibitor for a period of time sufficient to dissolve the scale. Thereafter, an alkaline material is added as a buffering material to bring the pH of the solution to about 8 to 12. Thereafter, adding an oxidizing agent and allowing the solution to remain in contact with the surface to provide a scale free surface with increased passivity toward oxidation.

---

The present invention relates to a method of treating ferrous metal surfaces and more particularly to a method for advantageously treating ferrous metal surfaces such as the internal surfaces of industrial equipment, i.e., boilers, feed water heaters and heat exchange equipment and the like, contaminated with incrustations of metallic oxides and other contaminants whereby removal of the incrustations is effected and the cleaned metal surface is rendered resistant to oxidation.

In the operation of industrial heat transfer equipment, incrustations of contaminants in the form of a scale usually are formed on the internal surfaces thereof despite the fact that in many instances the water employed is relatively pure. The problem of scale formation is particularly troublesome in the operation of high pressure steam generating equipment utilizing auxiliary equipment such as condensers and stage heaters formed at least partially of a copper alloy. The incrustations formed on the internal surfaces of such steam generating units include deposits of iron oxide and certain inorganic salts coming from impurities in the water along with small amounts of free and combined copper representing material corroded from the copper alloy auxiliary equipment. The scale formation substantially reduces the heat transfer characteristics of the equipment and thus it is conventional practice periodically to clean the equipment surfaces of the incrusted scale to insure economy of operation.

Numerous techniques have been proposed previously to effect the removal of the scale incrustations. The more common approach is to employ a treatment wherein an aqueous solution of hydrochloric acid is utilized to dissolve and disintegrate the contaminant deposits. Such prior methods, however, may not be suitable due to the fact that the acid treating solutions employed by others also undesirably may attack and corrode the ferrous metal surface of the equipment and, more commonly, are not successful in effecting a removal of the copper contaminant since the copper, upon being dissolved, plates back onto the ferrous metal surface from the acidic electrolyte solution. The problem of equipment corrosion by the acid cleaning solutions largely has been minimized by the utilization in the treating solutions of compounds which selectively retard the corrosivity of the acid solutions toward the ferrous surfaces. The copper redeposition problem, on the other hand, has remained to be bothersome.

One method which has been suggested to obviate the difficulties attendant equipment cleaning operations due to the presence of copper in the scale incrustations is that disclosed in U.S. Patent 2,567,835. This technique involves initially contacting the scale-contaminated surface with a hydrochloric acid solution containing a corrosion inhibitor to dissolve the scale, washing the acid-treated surface with water, then contacting the washed surface with an ammoniacal solution containing an oxidizing agent, washing the base-treated surface with water, then again subjecting the surface to the action of a hydrochloric acid solution, and thereafter utilizing a final water washing step. The above-described method has not proven to be completely suitable, however, due to the fact that it is not always effective and its time consuming series of complex steps with the requisite equipment and operating expenditures have rendered it substantially economically nonfeasible.

An alternative technique which has been proposed as an answer to the copper redeposition problem entails the utilization of an acid scale cleaning solution containing thiourea or its lower alkyl substituted derivatives and an organic base corrosion inhibitor, as exemplified by Patent No. 2,959,555. This approach, while providing a substantial solution to copper replating difficulties, still is not completely satisfactory for use in that the thiourea compound interferes somewhat with the inhibiting action of the corrosion inhibitor. Attempts to modify such a technique by the use of methylolthioureas in lieu of thiourea, as shown in Patent No. 3,074,825, have been successful in providing desired levels of incrustation removal without any appreciable redeposition of the copper contaminant or corrosive attack upon the ferrous surface. Such a technique, however, while apparently providing the best results of the methods heretofore available, has not proven to be a totally satisfactory solution to the problem of treating incrusted ferrous surfaces since contaminated surfaces treated thereby do not display desired levels of resistance to oxidation prior to their return to service.

Accordingly, it is the primary object of the present invention to provide an improved method for treating a scale-incrusted ferrous metal surface wherein removal of the incrustation is effected more advantageously in terms of over-all results than observed with methods of similar purpose heretofore available.

It is another object of the present invention to provide an improved method for treating a scale-incrusted ferrous metal surface to effect the removal of said incrustations wherein said removal is carried out in a simple, efficient, and economic manner.

An additional object of the present invention is to provide an improved method for effecting the removal of scale incrustations from a ferrous metal surface wherein said incrustation removal is achieved without any appreciable degradation of the ferrous metal surface.

It is a further object of the present invention to provide an improved technique for cleaning a scale-incrusted ferrous metal surface wherein removal of the scale coating is accomplished without any appreciable redeposition on said surface of copper initially present in said scale.

Still another objective of the present invention is to provide an improved method for treating a ferrous metal surface wherein subsequent to said treatment the treated ferrous metal surface obtained is rendered passive, i.e., retardant to subsequent oxidation.

It is a particular object of the present invention to provide an improved technique for utilization in high pressure steam generating operations employing auxiliary equipment formed of a copper alloy, which technique comprises periodically treating the internal surfaces of the steam generating equipment bearing copper-containing iron oxide incrustations formed thereon during the water heating cycles of the operations to advantageously, efficiently, and economically effect a removal of said incrustations and render the resulting cleaned surface passive to oxidation for a reasonable length of time.

Broadly described, the present invention provides an improved method for treating a ferrous metal surface having a coating thereon of scale incrustations including iron oxide deposits, such as copper-containing iron oxide deposits, which comprises immersing said incrustation-bearing surface in an aqueous phosphoric acid solution capable of dissolving said iron oxide deposits, said phosphoric acid solution containing an effective amount of a compound having the ability to inhibit corrosion of said ferrous metal surface by said phosphoric acid solution, allowing said phosphoric acid solution to remain in contact with said incrustation-bearing surface for a time period requisite to effect a substantial disintegration of said iron oxide deposits, thereafter adding to said acid solution an alkaline material selected from the group consisting of alkali metal hydroxides, ammonium hydroxide, and mixtures thereof to form a buffered aqueous treating solution having a pH in the range from about 8 to about 12, thereafter adding an oxidizing agent to said buffered treating solution, and allowing the resultant aqueous solution to remain in contact with said surface for a time period requisite to provide a ferrous metal surface which is substantially free of iron oxide deposits and has increased passivity toward oxidation.

In the more preferred embodiments thereof, the present invention provides a method of the aforesaid type wherein a compound capable of forming a stable complex with copper is added to said acid treating solution and/or said buffered treating solution along with the oxidizing agent. It will be understood that the term "complex," as herein employed, is intended to refer to both (a) compounds wherein copper is bonded to an electron donor without a ring system being formed (conventional complexes) and (b) compounds wherein copper is bonded to a substance which has two or more electron donor groups whereby one or more rings are formed (conventional chelates), unless it is otherwise specifically stated or apparent from the description in which the term appears that only compounds of group (a) are intended to be mentioned. It further will be understood that the phrase "complexing agent," as employed herein to describe those substances which combine with copper to form a "complex," is intended similarly to have either a generic (conventional complexing agents and chelating agents) or specific (only conventional complexing agents) meaning.

The present invention provides a method for cleaning iron oxide-containing incrustations from a ferrous metal surface which is simple, efficient, and commercially attractive in terms of its economy. The method of the present invention advantageously is characterized by an ability to efficiently achieve the desired degree of incrustation removal without the occurrence of any appreciable corrosion of the ferrous metal surface being treated. As a consequence of the non-corrosive aspects of the present treatment, the method of the present invention satisfactorily is adapted to be included in industrial cleaning operations without any sacrifice, and generally with substantial improvement, to the over-all economies of the operations. Furthermore, the method of the present invention advantageously is characterized by an ability to allow the desired incrustation cleaning operation to be carried out on surfaces contaminated with copper-containing iron oxide incrustations without the heretofore conventional redeposition of copper on the cleaned surface being observed, with the result that the present technique is an effective cleaning method for the removal of materials contaminating the ferrous metal surface. Moreover, the method of the present invention has the added advantage of being adapted to provide cleaned ferrous metal surfaces which display the significantly important characteristic of being passive to, and therefore being protected from, subsequent oxidation.

In the first step of the method of the present invention, the invention contemplates the utilization of an aqueous phosphoric acid solution having the ability to dissolve and disintegrate scale incrustations, including iron oxide deposits, which normally are found as contaminants on ferrous metal surfaces. The concentration of the phosphoric acid in the aqueous acid solution suitably may correspond to that commonly characterizing conventional ferrous metal surface acid cleaning techniques, although somewhat higher or lower concentrations may be employed. The phosphoric acid content of the starting acid solution utilized generally is in a range from about 0.5 to about 20%, preferably from about 2 to about 10%, by weight. During the acid treating step, the phosphoric acid concentration of the solution is gradually reduced by reaction of the acid with the metal values present in the incrustations, as evidence by the formation of precipitates in the treating solution. Hence, the phosphoric acid concentration of the solution resulting at the end of the acid treating step of the process may be significantly lower than the starting concentration. In some instances, it is preferable to effect a further reduction in the phosphoric acid concentration during the initial step by the use of one or several water dilutions of the acid treating solution. Such water dilution obviates solution handling problems due to high concentrations of precipitate solids which may be formed and is carried out when such precipitate formation becomes troublesome, preferably to maintain the solids content of the acid treating solution below about 10% by weight.

The corrosion inhibitor utilized in the aqueous acid solutions of the present method suitably may be any compound which is characterized by an ability to substantially inhibit or prevent corrosion of the underlying ferrous metal surface by the acid solution. Such corrosion inhibitors belong to well-known and accepted classes of materials and include, without limitation:

(a) Organic nitrogen bases which are aromatic and/or heterocyclic in nature derived from coal tar, such as aniline, acridine, pyridine, alpha- and beta-picoline, 4- and 2-n-amyl pyridine, 2-hexyl pyridine, 2,4- and 2,6-lutidine, 2,4,6-collidine, quinoline, lipidine, quinaldine, and the like, alone or in combination with an aldehyde, such as formaldehyde, and an organic sulfate or sulfonate wetting agent, such as diamyl sodium sulfosuccinate, as shown in Patent No. 2,606,873;

(b) Soluble modifications of the organic nitrogen bases listed in (a) which are the reaction products of said nitrogen bases, an organic chloride (e.g., ethylene dichloride, propylene dichloride, dichloroethyl ether, triglycol dichloride, benzyl chloride, or menaphthyl chloride) and an inorganic water-soluble thiocyanate (e.g., sodium or potassium thiocyanate) or thiourea, as exemplified by those shown in Patent No. 2,403,153;

(c) Organic nitrogen bases which are reaction products of an amine hydrochloride (e.g., ammonium chloride or methylamine hydrochloride), formaldehyde, and a ketone (e.g., acetone or 2-butanone), as shown in Patent No. 2,807,585;

(d) Rosin amines, including hydrogenated and dehydrogenated rosin amines;

(e) Ethoxylated derivatives of the rosin amines of (d) such as shown in Patent No. 2,510,063 containing 10–25 moles ethylene oxide; and (f) Reaction products of the rosin amines of (d) with formaldehyde and a ketone (e.g., acetone), as shown in Patent No. 2,758,970.

The preferred corrosion inhibitors for use are the organic nitrogen bases set forth in (a) and (c) above.

In accordance with the method of the present invention, the amount of the corrosion inhibitor employed in the phosphoric acid solution preferably is that requisite to essentially preclude attack on the ferrous metal base by the acid. The actual amount employed in specific embodiments depends upon, inter alia, the particular concentration of the acid solution, inhibitor, and temperature, employed. The corrosion inhibitor concentration generally is in the range from about 0.05 to about 2%, preferably from about 0.1 to about 1%, by weight of the phosphoric acid solution.

The initial step of the method, employing the inhibited phosphoric acid solution, suitably may be carried out over a relatively wide range of temperatures. The temperatures generally employed range between about 100° and about 210° F., preferably between about 130° and 175° F.

In the initial step of the method, the inhibited acid solution, which also may contain a copper complexing agent and/or other additives such as those producing a fluoride ion, e.g., hydrofluoric acid, sodium and potassium fluoride, and ammonium bifluoride, preferably is maintained in contact with the incrustation-contaminated ferrous metal surface for a time period requisite to effect solution and/or disintegration of substantially all of the iron oxide-containing incrustations. The actual time periods required in particular embodiments of the invention vary depending upon the specific acid solution and temperature employed. For the conditions described above, the time periods utilized generally are at least about 1½ hours, preferably from about 4 to about 6 hours. During at least a portion of the acid solution treating step, the acid solution often is agitated within the vessel whose internal surfaces are being treated or circulated through said vessel being treated by arranging the vessel to constitute a section of a closed acid solution circulation system.

At the conclusion of the acid solution treating step, while maintaining the treating solution in contact with the ferrous metal surface being cleaned, the pH of the treating solution is adjusted to be in the range of from about 8 to 12, preferably between about 8.5 and about 9.5. Preliminary to the pH adjustment, if it had not previously been carried out, the solids concentration of the cleaning solution preferably is adjusted by water dilution to be in the range of from about 0.25 to about 10% by weight. The pH adjustment of the solution is effected by the addition thereto of an alkaline material selected from the group consisting of alkali metal hydroxides, i.e., sodium, potassium and lithium hydroxides, and ammonium hydroxides and mixtures thereof, preferably in combination with a copper complexing agent if one is not already present, whereby a buffered treating solution having the desired pH characteristics is formed. The alkaline material preferred for use is sodium hydroxide, ammonium hydroxide, or a mixture thereof.

The amount of the alkaline material employed in the pH adjustment step depends primarily upon the concentration of the acid solution employed and the characteristics of the contamination of the ferrous metal surfaces being cleaned.

The complexing agents contemplated to be utilized in the preferred embodiments of the present invention suitably may be any inorganic or organic water-soluble compound having the ability to form a water-soluble of insoluble complex with copper, preferably a water-soluble copper chelate. Specific examples of suitable complexing agents include ammonium compounds, such as ammonium chloride, bromide, bifluoride, etc.; polyphosphates, such as akali metal, e.g., sodium, pyrophosphate, tripolyphosphate, trimetaphosphate, tetrametaphosphate; aliphatic amines, such as ethylene diamine, diethanol amine, and triethanol amine; amino aliphatic carboxylic acids, such as ammonia diacetic acid, ammonia triacetic acid, glycine, diglycine, triglycine, glutamic acid, aspartic acid, ethylenediamine tetraacetic acid, monoethanol-ethylenediamine tetraacetic acid, diethanolethylenediamine tetraacetic acid, propylene-1, 2-diamine tetraacetic acid, butylene diamine tetraacetic acid, diethylene triamine pentaacetic acid, and dipropylene triamine pentaacetic acid, and the alkali salts thereof, e.g., sodium, potassium, lithium and ammonium; hydroxy aliphatic carboxylic acids, such as serine, gluconic acid, glucono deltalactone, tartaric acid, citric acid, and the alkali metal and ammonium salts thereof; o-hydroxy aromatic acids, such as salicylic acid and the alkali metal and ammonium salts thereof; o-nitro aromatic alcohols, such as o-nitrophenol; and substituted and unsubstituted thiourea compounds, such as thiourea, 1,3-dimethyl thiourea, ethylene thiourea, 1,3-diethyl thiourea, 1,3-diisopropyl thiourea, monomethylol thiourea, and dimethylol thiourea. The preferred complexing agents for use are the amino aliphatic carboxylic acids and salts thereof. The amount of the complexing agents employed suitably may vary. Generally, the complexing agent is present in an amount in the range of from about 0.1 to about 4% by weight of the treating solution in which it is employed.

Although the present invention contemplates adding an oxidizing agent immediately to the buffered solution and treating the ferrous surface with the resultant solution, preferably the surface is subjected to an intermediate treatment with the buffered solution without the oxidizing agent.

The step of the preferred embodiments of the process employing the buffered treating solution alone is carried out utilizing a temperature within the range from about 100° and about 210° F., preferably from about 130° and about 160° F.

The treatment with the buffered treating solution preferably is carried out for a time period necessary to effect a substantially complete removal of scale incrustations remaining on the ferrous metal surface. The actual time periods involved will vary from instance to instance depending primarily upon the nature of the particular buffered treating solution employed, the nature of the incrustation deposits, and the treating temperature. For the above-described conditions, time periods generally employed are at least about 1 hour, preferably from about 1½ to about 5 hours.

Upon completion of the treating step utilizing such a buffered solution, an oxidizing agent then is added to the buffered solution while maintaining the treating solution in contact with the ferrous metal surface being treated. The oxidizing agent employed suitably may be any water-soluble compound capable of oxidizing metallic copper to the cuprous or cupric state. Specific examples of such oxidizing agents include, without limitation, hydrogen peroxide, alkali metal (e.g., sodium, potassium, and lithium) or ammonium chlorate, bromate, perchlorate, persulfate, perborate, percarbonate, permanganate, nitrite, and the like. Sodium nitrite constitutes the preferred embodiment of the oxidizing agent.

The amount of the oxidizing agent employed preferably is in excess of that required to effect the oxidation of copper values present. The amount generally employed provides an oxidizing agent concentration in the range from about 0.1 to about 2%, preferably about 0.4 to about 0.8%, by weight of the treating solution.

The oxidizing agent-containing treating solution is maintained in contact with the surface being cleaned until such time as an essentially deposit-free clean surface is obtained. The requisite time periods will vary in each case and in the preferred embodiments, wherein an intermediate treatment with the buffered solution without the oxidizing agent is employed, are at least about 30 minutes, preferably from about 45 minutes to about 3 hours.

The treatment with the oxidizing agent-containing solution is preferably carried out at a temperature in the range of from about 100° to about 180° F., preferably from about 130° to about 160° F.

Upon completion of the treatment of the surface with the oxidizing agent-containing solution the treating solution is drained from the now cleaned ferrous metal surface whereby a surface is obtained which is essentially free of contaminant values initially present in the scale incrustations and which further advantageously is rendered passive toward subsequent oxidation.

The method of the invention having been described above in detail, the following examples are given to show further specific embodiments thereof. It will be understood that the examples are given merely for illustration purposes and not by way of limitation.

EXAMPLE I

An aqueous 4% phosphoric acid solution, containing about 0.1% by weight of the 4-hydroxy-piperidine derivative prepared in accordance with Example A of U.S. Patent No. 2,807,585 as a corrosion inhibitor, was circulated through a boiler previously employed in steam generation and having the internal surface thereof contaminated by a deposit of copper-containing iron oxide incrustations. The amount of the phosphoric acid solution utilized (2500–3000 gallons) was sufficient to completely fill the boiler. The temperature of the circulating acid solution was maintained between about 160° and 175° F. Circulation of the inhibited phosphoric acid solution was continued for about 1.5 hours. Circulation was then stopped and the boiler was allowed to soak for 1 hour, after which circulation was restarted and continued for an additional hour. At the end of this time period about 110 gallons of aqueous 50% sodium hydroxide solution were added to the circulating phosphoric acid solution and the circulation of the resulting solution was continued for about 1.5 hours. Then about 50 more gallons of 50% sodium hydroxide were added to provide a buffered solution having a pH of about 8.5. The resulting buffered solution was continued to be circulated through the boiler at a temperature of about 165° for a period of about 1 hour. Thereafter, about 100 pounds of sodium nitrite were added to the circulating buffered solution. With the temperature being maintained at about 160° F. circulation of the sodium nitrite-containing solution was continued for about 2.5 hours, at which time circulation was discontinued and the solution drained from the boiler. The internal surface of the boiler thereby obtained was cleaned essentially free of scale incrustations and was observed to be essentially free of metallic copper. Inspection of the boiler internal surface after it had been allowed to stand about five days exposed to the atmosphere revealed no trace of rust and showed that the treatment had imparted a passivity to the surface toward oxidation.

What is claimed is:

1. An improved method for treating a ferrous metal surface having a coating thereon of scale incrustations including iron oxide deposits which comprises immersing said incrustation-bearing surface in an aqueous phosphoric acid solution capable of dissolving said iron oxide deposits, said phosphoric acid solution containing an effective amount of a compound having the ability to inhibit corrosion of said ferrous metal surface by said phosphoric acid solution, allowing said phosphoric acid solution to remain in contact with said incrustation-bearing surface for a time period requisite to effect a substantial disintegration of said iron-oxide deposits, thereafter adding to said acid solution an alkaline material selected from the group consisting of alkali metal hydroxides, ammonium hydroxide and mixtures thereof to form a buffered aqueous treating solution having a pH in the range from about 8 to about 12, thereafter adding an oxidizing agent to said buffered treating solution, and allowing the resultant aqueous solution to remain in contact with said surface for a time period requisite to provide a ferrous metal surface which is substantially free of iron-oxide deposits and has increased passivity toward oxidation.

2. The method according to claim 1 wherein said aqueous phosphoric acid solution has a phosphoric acid concentration of from about 0.5 to 20% by weight.

3. The method acording to claim 1 wherein said treatment is carried out at a temperature in the range from about 100° to about 210° F.

4. The method according to claim 3 wherein said incrustation-bearing ferrous metal surface being treated is contacted with said phosphoric acid solution for a time period of at least about 1.5 hours, said buffered solution for a time period of at least about 1 hour, and said oxidizing agent-containing solution for a time period of at least about 30 minutes.

5. The method according to claim 1 wherein said alkaline material is sodium hydroxide.

6. The method according to claim 1 wherein said alkaline material is ammonium hydroxide.

7. The method according to claim 1 wherein said oxidizing agent is sodium nitrite.

8. The method according to claim 1 wherein the concentration of said oxidizing agent in said oxidizing agent-containing solution is in the range from about 0.1 to about 2% by weight.

9. The method according to claim 1 wherein said corrosion inhibitor is an organic nitrogen base capable of inhibiting corrosion of said ferrous metal surface by said acid.

10. The method according to claim 1 wherein said phosphoric acid solution also contains a compound which is capable of forming a stable complex with copper.

11. The method according to claim 1 wherein said buffered solution also contains a compound which is capable of forming a stable complex with copper.

12. The method according to claim 1 wherein, preliminary to said addition of said alkaline material to said acid solution, the solids content of said acid solution is adjusted by water dilution to be in the range of from about 0.25 to about 10% by weight.

13. An improved method for treating a ferrous metal surface having a coating thereon of scale incrustations including iron oxide deposits which comprises immersing said incrustation-bearing surface in an aqueous 0.5 to 20% phosphoric acid solution containing an effective amount of a compound having the ability to inhibit corrosion of said ferrous metal surface by said acid solution, allowing said acid solution to contact said incrustation-bearing surface for a time period of at least about 1.5 hours to effect a substantial disintegration of said iron-oxide deposits, thereafter adding to said acid solution an alkaline material selected from the group consisting of alkali metal hydroxides, ammonium hydroxide, and mixtures thereof to form a buffered aqueous treating solution having a pH in the range from about 8 to about 12, allowing said buffered solution to contact said ferrous metal surface being treated for a time period of at least about 1 hour, thereafter adding to said buffered treating solution a sufficient amount of an oxidizing agent to provide an oxidizing agent concentration in the range from about 0.1 to about 2% by weight of the resultant solution, and allowing the resulting solution to contact said ferrous metal surface for a time period of at least about 30 minutes to provide a ferrous metal surface which is substantially free of iron-oxide deposits and has an increased passivity toward oxidation, said contactings with said solutions being carried out at a temperature in the range from about 130° to about 175° F.

14. The method according to claim 13 wherein said alkaline material is sodium hydroxide.

15. The method according to claim 13 wherein said alkaline material is ammonium hydroxide.

16. The method according to claim 13 wherein said oxidizing agent is sodium nitrite.

17. The method according to claim 13 wherein said corrosion inhibitor is present in an amount in the range of from about 0.1 to about 2% by weight of said phosphoric acid solution.

18. The method according to claim 13 wherein said corrosion inhibitor is an organic nitrogen base capable of inhibiting corrosion of said ferrous metal surface by said acid.

19. The method according to claim 13 wherein said phosphoric acid solution also contains a compound capable of forming a stable complex with copper.

20. The method according to claim 13 wherein said buffered solution also contains a compound which is capable of forming a stable complex with copper.

21. The method according to claim 13 wherein, preliminary to said addition of said alkaline material to said acid solution, the solids content of said acid solution is adjusted by water dilution to be in the range of from about 0.25 to about 10% by weight.

References Cited

UNITED STATES PATENTS

| | | | |
|---|---|---|---|
| 2,499,261 | 2/1950 | Rosenbloom | 148—6.15 XR |
| 2,609,308 | 9/1952 | Gibson | 148—6.15 XR |
| 2,959,555 | 11/1960 | Martin | 252—149 |
| 2,965,523 | 12/1960 | Engle | 134—28 XR |

MORRIS O. WOLK, Primary Examiner

M. D. BURNS, Assistant Examiner

U.S. Cl. X.R.

21—2; 134—2, 22, 27, 28; 148—6